United States Patent

Werner

[15] 3,674,796

[45] July 4, 1972

[54] BASIC ETHERS OF 1-HYDROXYPHENYLBENZCYCLOALKANE-2-SPIROCYCLOALKYL DERIVATIVES

[72] Inventor: Lincoln Harvey Werner, Summit, N.J.

[73] Assignee: Ciba-Geigy Corporation, Summit, N.J.

[22] Filed: Dec. 20, 1968

[21] Appl. No.: 785,785

[52] U.S. Cl..............260/295.5 S, 260/243 B, 260/293.66, 260/247.2 R, 260/247.7 A, 260/239 B, 260/326.14 T, 260/326.5 M, 260/570.7, 424/266, 424/274, 424/325
[51] Int. Cl. .....................................C07d 27/02
[58] Field of Search..............260/570.7, 326.14 T, 326.5 M, 260/295.5 S

[56] References Cited

UNITED STATES PATENTS

| | | | |
|---|---|---|---|
| 3,164,607 | 1/1965 | Lednicer | 260/326.5 M |
| 3,274,213 | 9/1966 | Lednicer | 260/570.7 |
| 3,293,263 | 12/1966 | Lednicer | 260/326.5 M |
| 3,313,853 | 4/1967 | Lednicer | 260/570.7 |
| 3,396,169 | 8/1968 | Lednicer | 260/293.66 |

Primary Examiner—Alan L. Rotman
Attorney—Harry Goldsmith, Joseph G. Kolodny, Bryant W. Brennan and Edward J. Sites

[57] ABSTRACT

Basic ethers of 1-hydroxyphenyl-benzcycloalkane-2-spirocycloaliphatic compounds, e.g. those of the formula

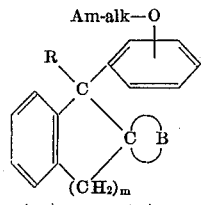

alk = lower alkylene
Am = an amino group
R = H or OH
B = lower alkylene or alkenylene
m = 1–3 acyl derivatives, salts and quaternaries thereof exhibit antiestrogenic effects.

6 Claims, No Drawings

BASIC ETHERS OF 1-HYDROXYPHENYLBENZCYCLOALKANE-2-SPIROCYCLOALKYL DERIVATIVES

SUMMARY OF THE INVENTION

The present invention concerns and has for its object the provision of new basic ethers of 1-hydroxyphenyl-benzcycloalkane-2-spirocycloaliphatic compounds, preferably of those having the Formula I

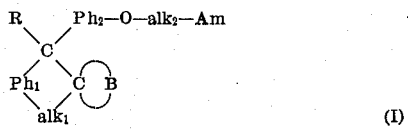

(I)

in which $Ph_1$ is a 1,2-phenylene radical, $alk_1$ is lower alkylene contributing one to three ring-carbon atoms, B is lower alkylene or alkenylene contributing four to six ring-carbon atoms, $Ph_2$ is a phenylene radical, R is hydrogen, free or etherified hydroxy, Am is an amino group and $alk_2$ is lower alkylene separating adjacent heteroatoms by at least two carbon atoms, acyl derivatives, salts and quaternaries thereof, as well as of corresponding pharmaceutical compositions and of methods for the preparation and application of these products. Said compositions are especially useful as estrus inhibitors and antifertility agents.

DESCRIPTION OF THE PREFERRED EMBODIMENTS

The 1,2-phenylene radical $Ph_1$ and the 1,2-, 1,3- or 1,4-phenylene radical $Ph_2$ are unsubstituted or substituted by one or more than one of the same or of different substituents attached to any of the four positions available for substitution. Such substituents are primarily lower alkyl, e.g. methyl, ethyl, n- or i-propyl or -butyl, etherified or esterified hydroxy, such as lower alkoxy, e.g. methoxy, ethoxy, n- or i-propoxy or -butoxy, three to seven ring-membered cycloalkoxy or cycloalkyl-lower alkoxy, e.g. cyclo-propoxy, 2,3-dimethyl-cyclopropoxy, cyclobutoxy, cyclopentoxy, 2,5- or 3,4-dimethyl-cyclopentoxy, cyclohexoxy or 4-methyl-cyclohexoxy; cyclopropylmethoxy, 2-cyclopentylethoxy or cyclohexylmethoxy, halogeno, e.g. fluoro, chloro or bromo, trifluoromethyl, nitro or amino, especially di-lower alkylamino, e.g. dimethylamino or diethylamino. The term "lower" referred to above or hereinafter in connection with organic radicals or compounds respectively, defines such with up to seven, preferably up to four, carbon atoms.

More particularly $Ph_1$ stands for 1,2-phenylene, (lower alkyl)-1,2-phenylene, mono- or di-(lower alkoxy)-1,2-phenylene, (lower cycloalkoxy)-1,2-phenylene, (halogeno)-1,2-phenylene or (trifluoromethyl)-1,2-phenylene, and $Ph_2$ for 1,2-, 1,3- or preferably 1,4-phenylene, (lower alkyl)-1,n-phenylene, mono- or di-(lower alkoxy)-1,n-phenylene, (lower cycloalkoxy)-1,n-phenylene, (halogeno)-1,n-phenylene or (trifluoromethyl)-1,n-phenylene wherein n is 2,3 or preferably 4.

The lower alkylene portion $alk_1$ above all represents methylene, 1,2-ethylene or 1,3-propylene, but also represents 1,1-ethylene, 1,1-, 1,2- or 2,2-propylene, 2-methyl-1,3-propylene, 1,1-, 1,2-, 1,3-, 2,2- or 2,3-butylene, 1,1-, 1,2-, 1,3-, 2,2-, 2,3-, 2,4- or 3,3-pentylene, 1,3- or 2,3-hexylene or 3,5-heptylene.

The lower alkylene or alkenylene radical B preferably represents 1,4-butylene, 1,5-pentylene or 1,5-pent-2-enylene, but also represents 1,4-pentylene, 1,4-, 1,5-, 2,5- or 1,6-hexylene, 1,4-, 1,5-, 1,6-, 2,5- or 2,6-heptylene; 1,4-but-2-enylene, 1,4-pent-2-enylene, 1,6-hex-3-enylene or 2,6-hept-3-enylene.

The lower alkylene radical $alk_2$ above all stands for 1,2-ethylene, 1,2- or 1,3-propylene, but also for 2-methyl-1,3-propylene, 1,2-, 1,3-, 1,4- or 2,3-butylene, 1,5- or 2,4-pentylene, 1,3-, 1,4- or 1,6-hexylene or 3,5-heptylene.

The amino group Am is a primary, secondary or preferably a tertiary amino group, such as amino, mono- or di-lower alkylamino, e.g. methylamino, ethylamino, n- or i-propylamino or n-butylamino; dimethylamino, N-methyl-N-ethylamino, diethylamino, di-n-propylamino, di-isopropylamino or di-n-butylamino; free or esterified hydroxy-lower alkylamino, N-(hydroxy-lower alkyl)-N-lower alkylamino or di-(hydroxy-lower alkyl)-amino, in which hydroxy is separated from the amino nitrogen by at least two carbon atoms, e.g. 2-hydroxyethylamino, 3-hydroxypropylamino, N-(2-hydroxy-ethyl)-N-methylamino or di-(2-hydroxyethyl)-amino; monocyclic cycloalkylamino, cycloalkyl-lower alkylamino, N-cycloalkyl-N-lower alkylamino or N-cycloalkyl-lower alkyl-N-lower alkylamino in which cycloalkyl has preferably three to seven ring-carbon atoms, e.g. cyclo-propylamino, cyclopentylamino, cyclohexylamino, cyclopropylmethylamino, 2-cyclopentyl-ethylamino, N-cyclopentyl-N-methylamino, N-cyclohexyl-N-methylamino, N-cyclohexyl-N-ethylamino, N-cyclopentyl-methyl-N-ethylamino or N-(2-cyclopentylethyl)-N-methylamino, aralkylamino or N-lower alkyl-N-aralkylamino, in which the aryl, e.g. phenyl, moiety is unsubstituted or substituted as shown for $Ph_1$ and $Ph_2$, such as benzylamino, 2-phenethylamino, N-methyl-N-benzylamino, N-ethyl-N-benzylamino or N-ethyl-N-(1- or 2-phenethyl)-amino; lower alkyleneimino or free or esterified hydroxy-alkyleneimino, e.g. ethyleneimino, pyrrolidino, 2-methyl-pyrrolidino, piperidino, 2- or 4-methyl-piperidino, 3- or 4-hydroxy-piperidino, 3-hydroxymethyl-piperidino, 1,6- or 2,5-hexamethyleneimino, 1,7- or 2,6-heptamethyleneimino, lower mono-oxa- or thia-alkyleneimino, e.g. morpholino, 3-methylmorpholino or thiamorpholino, monoaza-lower alkyleneimino, N-lower alkyl- or free or esterified N-(hydroxy-lower alkyl)-monoaza-lower alkyleneimino, e.g. piperazino, N-methyl, -ethyl-, -n-propyl, -i-propyl, -2-hydroxyethyl- or -3-hydroxy-propyl-piperazino, N-methyl-, N-methyl-, -2-hydroxy-ethyl- or -n-propyl-3-aza-1,5- or 1,6-hexyleneimino, or N-methyl-4-aza-1,7- or 2,6-heptyleneimino. The amino group Am may also be linked with the $alk_2$ moiety, so that $alk_2$-Am together represents, for example, aza-cycloalkyl, aza-cycloalkyl-lower alkyl, N-lower alkyl-aza-cycloalkyl or N-lower alkyl-aza-cycloalkyl-lower alkyl, e.g. 2- or 3-pyrrolidyl, 1-methyl- or -ethyl-3-pyrrolidyl, 3- or 4-piperidyl or -piperidylmethyl, 1-methyl or -ethyl-3- or 4-piperidyl or -piperidylmethyl. In the corresponding compounds of Formula I, the heteroatoms in the saturated moieties, e.g. those adjacent to $alk_2$ or present in Am, are separated by at least two carbon atoms.

An etherified hydroxy group R is preferably lower alkoxy, e.g. methoxy, ethoxy, n- or i-propoxy or -butoxy.

Acyl derivatives of the invention are preferably those of the primary or secondary amines or hydroxyalkyl compounds, but may also be those containing an acyloxy group attached to the 1-position. The acyl group therein stands preferably for lower alkanoyl, such as acetyl, propionyl, butyryl or pivalyl, but also for lower alkenoyl, such as acryloyl or methacryloyl, monocyclic carbocyclic aroyl or aryl-lower alkanoyl or -alkenoyl, such as benzoyl, phenylacetyl or cinnamoyl. The quaternaries of the invention are preferably the lower alkyl or aralkyl, e.g. phenyl-lower alkyl quaternaries. Said acyl, alkyl or aralkyl radicals are unsubstituted or substituted, especially in the aromatic portion, as shown for $Ph_1$ and $Ph_2$.

The compounds of the invention exhibit valuable pharmacological properties. For example, they inhibit the effects of estrogens, e.g. estradiol, as can be demonstrated in animal tests, using advantageously mammals, such as rats, as test objects. Such tests can be performed as follows: Immature female rats of about 50–60 g are ovariectomized and maintained under standard laboratory conditions for one week. Hereupon the group of these animals is divided into four subgroups, the first is serving as control, the second is treated subcutaneously with 0.1 µg estradiol (in sesam oil)/rat/day, the third is treated orally with about 0.1 to 15 mg/kg/day of a compound of this invention (in water) and the fourth is treated with said amounts of estradiol and a compound of the invention, whereby the drugs are administered for 7 days. The animals are autopsied on the 8th day, the uterus resected, cleaned from extraneous fat and connective tissue and weighed. The mean uterine weight of the control animals is about 22 mg, and that of the second group animals is about 132 mg. The mean uterine weight of the third and fourth group animals is usually found somewhere in between said limits, indicating that the compounds of the invention are weak uterotrophic agents and antagonists of estradioal. Besides their above-mentioned utility, the compounds of this invention are also useful intermediates in the manufacture of other valuable, particularly pharmacologically active, products.

Particularly useful are compounds of the Formula I, in which $Ph_1$ stands for 1,2-phenylene and $Ph_2$ for 1,4-phenylene, or for (lower alkyl)-1,2- or -1,4-phenylene, mono- or di-(lower alkoxy)-1,2- or -1,4-phenylene, (halogeno)-1,2- or -1,4-phenylene or (trifluoromethyl)-1,2- or -1,4-phenylene respectively, $alk_1$ is methylene, 1,2-ethylene or 1,3-propylene, B is 1,4-butylene, 1,5- pentylene or 1,5-pent-2-enylene, R is hydrogen or hydroxy, $alk_2$ is 1,2-ethylene, 1,2- or 1,3-propylene and Am is di-lower alkylamino, lower alkyleneimino, mono-oxa-, -thia- or-aza-lower alkyleneimino or N-lower alkyl- or N-(hydroxy-or lower alkanoyloxy-lower alkyl)- monoaza-lower alkyleneimino, wherein the heteroatoms are separated by at least two carbon atoms, as well as such compounds, wherein $Ph_1$ and $Ph_2$ are also (lower cycloalkoxy)-1,2- or -1,4-phenylene respectively, B is also 1,6-hexylene and R is also lower alkoxy, and therapeutically useful acid addition salts thereof.

Especially valuable are compounds of Formula II

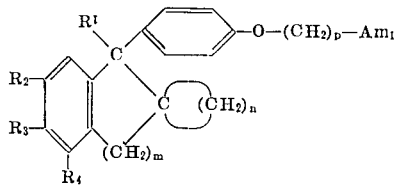

(II)

in which $R_1$ is hydrogen or hydroxy, each of $R_2$, $R_3$ and $R_4$ is hydrogen or one or two thereof are methoxy or one thereof is chloro and the others are hydrogen, $Am_1$ is dimethylamino, diethylamino or pyrrolidino, $m$ is the integer 1 or 2, $n$ is the integer 4 or 5 and $p$ is the integer 2 or 3, as well as such compounds, wherein $R_1$ is also methoxy or ethoxy, one of $R_2$, $R_3$ and $R_4$ also cyclopentoxy and $n$ also the integer 6, and therapeutically useful acid addition salts thereof which, when given at subcutaneous doses between about 0.1 and 15 mg/kg/day to immature, ovariectomized rats which are simultaneously treated with 0.1 μg estradiol/rat/day, outstandingly inhibit the estrogenic effects of estradiol. Of said compounds particularly the 1-[4-(3-dimethylaminopropoxy or 2-pyrrolidinoethoxy)-phenyl]-1,2,3,4-tetrahydro-naphthalene-2-spirocyclohexane, their 6-methoxy-derivatives and therapeutically useful acid addition salts thereof are most valuable anti-estrogens.

The compounds of the invention are prepared according to methods known per se. For example, they are obtained by (1) converting in a 1-(X-phenyl)-benzcycloalkane-2-spiroaliphatic compound, wherein X is a substituent capable of being converted into an aminoalkoxy group, X into said group, advantageously reacting compounds of the formulae

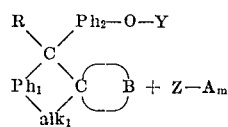

wherein one of Y and Z is hydrogen and the other is reactively modified hydroxy-alkyl or carboxy-alkyl and reducing any resulting carbonyl derivative, or (2) reacting an aminoalkoxy-phenyl metal compound with a 1-oxobenzcycloalkane-2-spiroaliphatic compound, e.g. those of the formulae

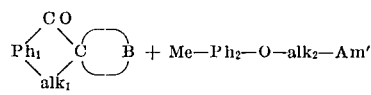

wherein Me is an alkali metal or halomagnesium and Am' tertiary amino and hydrolyzing the resulting adduct and, if desired, converting any resulting compound into another compound of the invention.

In the starting material shown under Item (1) the substituent X is, for example (a) free or reactively esterified hydroxy, e.g. halogeno, advantageously fluoro, (b) alkenyloxy or alkenoyloxy, reactively esterified hydroxy-alkoxy or -alkanoyloxy, such as (halogeno or sulfonyloxy, e.g. chloro, bromo, methanesulfonyloxy, ethanesulfonyloxy, benzenesulfonyloxy or tosyloxy)-alkoxy or -alkanoyloxy, or reactively converted carboxy-alkoxy or -alkanoyloxy, such as the halides, e.g. chlorides, azides, esters, e.g. lower alkyl esters, or anhydrides, e.g. lower alkanoic acid anhydrides thereof, furthermore, (c) imino- or carbamoyl-alkoxy or -alkanoyloxy, aminoalkanoyloxy, nitro- or cyano-alkoxy- or-alkanoyloxy. The starting material corresponding to the X mentioned under Item (a) or a salt thereof, is reacted with a reactively esterified, free or salified aminoalkanol respectively, that corresponding to the X mentioned under Item (b) is reacted with ammonia or an amine and any resulting carbonyl compound is reduced, as is the case with the starting material corresponding to the X mentioned under Item (c). In Reaction (a) the phenolic component is advantageously used in the form of its metal salt, such as alkali metal, e.g. sodium or potassium salt, as is the case with the aminoalkanol used in the reaction with the halogeno, e.g. fluoro-phenyl compound. In Reaction (b) the addition of H-Am to unsaturated, e.g. allyloxy, compounds is advantageously carried out in the presence of an alkali, e.g. sodium hydroxide, and under pressure. In the condensation of the reactively modified alcohol or acid derivatives with ammonia or amines, alkali metal or acyl, e.g. phthaloyl, derivatives thereof, said basic agents are preferably used in excess, in order to neutralize the generated acid. They may, however, also be used in equivalent amounts and in the presence of other condensing agents such as inorganic or organic bases, e.g. alkali metal carbonates or bicarbonates or tertiary nitrogen bases, for example tri-lower alkylamines, N,N-dimethylaniline or pyridine. Azides are subjected to degradation according to the Curtius or Schmidt reaction, i.e. by the action of heat and/or acidic agents, e.g. sulfuric and, if desired, followed by hydrolysis or alcoholysis. The reduction of any phenol ester obtained according to b) or used in reaction c) is carried out analogously to the procedure disclosed in U.S. Pat. No. 3,264,303, i.e. with complex light metal hydrides, preferably sodium borohydride, in the presence of boron trifluoride or an etherate thereof. The carbamoyl compounds resulting from Reaction (b) or prepared otherwise and mentioned under Item (c) as well as the iminoalkoxy compounds (Schiff's bases or oximes), nitro and cyano compounds, are reduced in the usual manner, advantageously with the use of complex metal hydrides, such as alkali metal aluminum or borohydrides, e.g. lithium aluminum hydride or sodium borohydride, but also with the use of catalytically activated or nascent hydrogen, e.g. hydrogen in the presence of nickel, platinum or palladium catalysts or hydrogen generated during electrolysis or the reaction of metals with acids or alcohols, e.g. zinc and hydrochloric acid or sodium and ethanol.

The metal compound mentioned under Item (2) is preferably a Grignard compound, i.e. Me represents halomagnesium, advantageously bromomagnesium, but may also be an alkali metal, e.g. lithium, compound. It is reacted with the oxo compound under the usual conditions, yielding, after hydrolysis with water or aqueous acid or ammonium salt solutions, compounds of the Formula I, in which R is hydroxy.

The compounds of the invention so obtained may be converted into each other according to known methods. For example, resulting compounds in which B contains a double bond or R stands for hydroxy, said group and/or double bond may be reductively eliminated, for example with the use of catalytically activated hydrogen, or said hydroxy group etherified, for example, with lower alkanols in the presence of dehydrating agents, such as sulfuric acid, or with reactive esters and alcoholates thereof, e.g. reacting the alkali metal salt with lower alkyl halides, sulfates or sulfonates. Compounds in which Am is a primary or secondary amino group, can be reacted with a reactive ester of a corresponding alcohol, for example, such mentioned above, or can be acylated, for example, with a reactive functional derivative or a corresponding acid, such as a halide or anhydride thereof, resulting acyl derivatives may be split, for example, with the use of acidic or alkaline hydrolyzing agents, or phthaloyl compounds by hydrazinolysis. Resulting esters may also be hydrolyzed or transesterified or resulting alcohols esterified. Resulting tertiary amines may be quaternized in the usual manner, for example with the use of reactive esters of alcohols, preferably of lower alkanols, but also of aralkanols or resulting quaternaries converted into tertiary amines. For example, from benzyl-quaternaries the benzyl residue can be split off by hydrogenation.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. For example, the amines or alcohols mentioned above may be used in the form of their alkali metal, e.g. sodium or potassium salts. Mainly, those starting materials should be used in the process of the invention that lead to the formation of those compounds indicated above as being specially valuable.

The starting material used is known or, if new, may be prepared according to known methods. For example, that used in Reaction (1) can be obtained analogous to the method mentioned under Item (2), e.g. by reacting a Grignard compound of a differently etherified phenol, e.g. such of anisole, with the same oxo compound, subjecting the resulting adduct to hydrolysis and, if desired, hydrogenation, in order to eliminate the metal and, if desired, the 1-hydroxy group formed also and, moreover, the etherifying group. For the latter purpose advantageously melts of pyridine hydrochloride are used, to yield the desired 1-hydroxyphenyl-benzcycloalkane-2-spirocycloaliphatic compounds. The may also be prepared by reacting 1-hydroxy-benzcycloalkane-2-spiro-cycloaliphatic compounds with phenols under Friedl-Crafts conditions, i.e. in the presence of anhydrous aluminum chloride. The resulting 1-hydroxyphenyl compounds or their sodium salts may then be reacted analogous to Reaction (1) with the corresponding reactively modified alcohols or acids (the former being different from aminoalkanols), in order to obtain the starting material in which X is alkenyloxy, alkenoyloxy or hydroxy-, carboxy-, carbalkoxy-, nitro- or cyano-alkoxy or -alkanoyloxy. Resulting alcohols can then be esterified, e.g. with strong mineral or sulfonic acids using, for example, thionyl halides or phosphorus halides or oxyhalides or sulfonyl halides, e.g. thionyl chloride, phosphorus tri- or pentabromide or oxychloride, tosyl or brosyl chloride. Resulting acids may analogously be converted into their halides, which may further be reacted with amines, alcohols, acids or azides. The starting material mentioned under item 2) can be obtained according to the methods described in Compt. Rend. 139, p. 1805 (1954), J. Org. Chem. 27, p. 3,844 (1962), Bull. Soc. Chim. France 1957, p. 346 and 1966, p. 1,693.

Starting materials or final products that are mixtures of isomers, can be separated into the single isomers by methods in themselves known, e.g. by fractional distillation, crystallization and/or chromatography. Racemic products can likewise be resolved into the optical antipodes, for example by separation of diastereomeric salts thereof, e.g. by the fractional crystallization of d- or l-tartrates.

The above-mentioned neutral or acidic ethers of 1-hydroxyphenyl-benzcycloalkane-2-spriocycloaliphatic compounds, used as starting material, are new and are a further object of the present invention. They are preferably those of the formula III

(III)

in which $R_0$ stands for a neutral or acidic aliphatic or araliphatic radical, preferably for lower alkyl, lower alkenyl, three to seven ring-membered cycloalkyl, cycloalkenyl, cycloalkyl-lower alkyl or cycloalkenyl-lower alkyl, or the radical $alk_2$-$R_5$ in which $R_5$ is hydroxy, halogeno, lower alkoxy, lower alkylmercapto, carboxy or aryl, e.g. phenyl, (lower alkyl)-phenyl, (lower alkoxy)-phenyl, (halogeno)-phenyl, (trifluoromethyl)-phenyl, (nitro)-phenyl or (carboxy)-phenyl and the other symbols have the meaning given for Formula I, the esters, e.g. lower alkyl esters, amino-lower alkyl esters, e.g. Am-lower alkyl esters, amides, e.g. Am-amides, metal and ammonium salts of the carboxy compounds.

These compounds of formula III also have valuable pharmacological properties, for example, such mentioned for the compounds of Formula I, as well as hypocholesterolemic activity.

Especially valuable are compounds of Formula IV

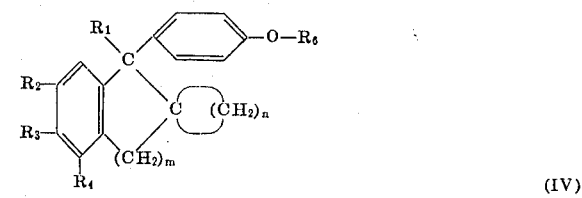

(IV)

in which $R_1$ is hydrogen, hydroxy, methoxy or ethoxy, each of $R_2$, $R_3$ and $R_4$ is hydrogen or one or two thereof are methoxy or one thereof is cyclopentoxy or chloro and the others are hydrogen, $R_6$ is methyl, cyclopentyl, carboxymethyl, or N,N-diethylcarbamoylmethyl, $m$ is the integer 1 or 2 and $n$ is the integer 4, 5 or 6, the ethyl or 2-diethylaminoethyl ester and alkali metal or ammonium salts of the carboxy compounds which, when given at subcutaneous doses between about 0.1 and 30 mg/kg/day to immature, ovariectomized rats, which are simultaneously treated with 0.1 μg estradiol/rat/day, show an outstanding inhibition of the estrogenic effects of estradiol, or when given at these doses to mature male or female rats fed a normal or high cholesterol feed, show hypocholesterolemic effects.

The pharmaceutically active compounds of the invention can be used, for example, for the manufacture of pharmaceutical or veterinary compositions, containing them in conjunction or admixture with inorganic or organic, solid or liquid pharmaceutical excipients, suitable for enteral or parenteral administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75 percent, more particularly 1 to 50 percent, of the active ingredient. They are also included within the scope of the present invention.

The following examples are intended to illustrate the invention and are not to be construed as being limitations thereon. Temperatures are given in degrees Centigrade, and all parts wherever given are parts by weight.

EXAMPLE 1

To the solution of 4.5 g 1-(4-hydroxy-phenyl)-1,2,3,4-tetrahydro-naphthalene-2-spirocyclohexane, 25 ml toluene and 15 ml dimethylformamide, 0.725 g of a 56 percent suspension of sodium hydride in mineral oil are added while stirring and the mixture is heated to 90° for 45 minutes. After cooling, 14 ml 3-dimethylaminopropyl chloride are added dropwise and the mixture stirred at about 70° for 18 hours. After cooling, it is filtered, the filtrate evaporated in vacuo, the residue triturated with water and the mixture extracted with ethyl acetate. The extract is washed with water and with diluted hydrochloric acid and the acidic solution separated. It is made basic with aqueous sodium hydroxide, extracted with ethyl acetate, the extract washed with water, dried, filtered and evaporated in vacuo. The residue is taken up in 75 ml ethyl acetate, the solution acidified with hydrogen chloride in ethyl acetate, the precipitate formed filtered off, washed with ethyl acetate and dried in vacuo, to yield the 1-[4-( 3-dimethylamino-propoxy)-phenyl]-1,2,3,4-tetrahydro-naphthalene-2-spirocyclohexane hydrochloride of the formula

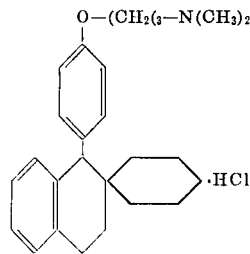

melting at 179°–180°.

In the analogous manner the 1-[4-(2-pyrrolidino-ethoxy)-phenyl]-1,2,3,4-tetrahydro-naphthalene-2-spirocyclohexane hydrochloride, melting at 128°–130°, is prepared from equivalent amounts of the corresponding starting material.

The starting material can be prepared as follows: To the suspension of 57.2 g potassium t.-butoxide in 500 ml benzene, the solution of 29.8 g 1-oxo-1,2,3,4-tetrahydro-naphthalene in 400 ml benzene is slowly added while cooling and stirring under nitrogen. Hereupon the solution of 46.9 g 1,5-dibromopentane in 50 ml benzene is adding during 45 minutes and the mixture slowly heated and refluxed for 5 hours. After standing overnight at room temperature, it is poured over 350 g crushed ice and 80 ml concentrated hydrochloric acid. The organic layer is separated and the aqueous solution extracted with diethyl ether. The combined organic solutions are washed with 5 percent aqueous sodium carbonate and water, dried, filtered and evaporated in vacuo. The residue is distilled and the fraction boiling at 122°–128°10.3 mm Hg collected; it represents the 1-oxo-1,2,3,4-tetrahydro-naphthalene-2-spirocyclohexane.

To the solution of 10 g thereof in 100 ml methanol, the solution of 5 g sodium borohydride in 18 ml water and 2 ml 2N aqueous sodium hydroxide is added dropwise while stirring and the mixture is stirred at room temperature for 20 hours. It is evaporated, the residue triturated with water and the mixture extracted with diethyl ether. The extract is washed with water, dried, filtered and evaporated, to yield the 1-hydroxy-1,2,3,4-tetrahydro-naphthalene-2-spirocyclohexane.

The solution of 29 g thereof in 75 ml benzene, 125 ml hexane and 12.6 g phenol, is added dropwise to the mixture of 25.2 g phenol and 8.93 g aluminum chloride during 75 minutes while stirring and cooling. The mixture is stirred at room temperature overnight and is finally heated to about 60° for 5 hours. After cooling, it is poured into 150 ml 6N hydrochloric acid, the organic layer separated and the aqueous solution extracted with diethyl ether. The combined organic solutions are washed with saturated aqueous sodium acetate, dried, filtered and evaporated. The residue is distilled, the fraction boiling at 80°–100°/20 mm Hg collected and recrystallized from methanol, to yield the 1-(4-hydroxy-phenyl)-1,2,3,4-tetrahydro-naphthalene-2-spirocyclohexane melting at 155°–157°.

EXAMPLE 2

To the stirred solution of 4.5 g 1-(4-hydroxy-phenyl)-1,2,3,4-tetrahydro-naphthalene-2-spirocyclohexane in 25 ml toluene and 10 ml dimethyl formamide, 0.725 g of a 56 percent suspension of sodium hydride in mineral oil are added and the mixture is heated for 45 minutes to 90°. After cooling, 2.3 g 2-diethylamino-ethyl chloride in 25 ml toluene are added and the mixture stirred for 24 hours at 65°. After cooling, it is filtered, the filtrate evaporated in vacuo, the residue taken up in ethyl acetate, the solution washed with water and extracted with diluted hydrochloric acid. The aqueous solution is made basic with 6N aqueous sodium hydroxide and extracted with ethyl acetate. The extract is washed with water, dried, filtered and evaporated in vacuo. 4 g of the residue are dissolved in 20 ml isopropanol and to the solution 1.18 g maleic acid in 10 ml isopropanol are added. The mixture is allowed to stand for 3 days in the refrigerator, the precipitate formed is filtered off, recrystallized from isopropanol and dried in vacuo, to yield the 1-[4-(2-diethylamino-ethoxy)-phenyl]-1,2,3,4-tetrahydro-naphthalene-2-spirocyclohexane maleate of the formula

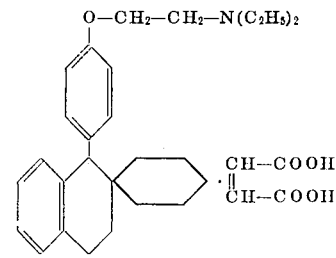

melting at 118°–119°.

EXAMPLE 3

To the Grignard reagent, prepared from 8.1 g 4-(2-pyrrolidino-ethoxy)-bromobenzene and 0.73 g magnesium turnings in 50 ml tetrahydrofuran, the solution of 5 g 1-oxo-6-methoxy-1,2,3,4-tetrahydro-naphthalene-2-spirocyclohexane in 20 ml tetrahydrofuran is added dropwise while stirring and cooling. The mixture is stirred for 4 hours and allowed to stand at room temperature overnight. It is filtered, the filtrate evaporated in vacuo and the residue taken up in benzene. To the solution, 25 ml water are added dropwise while cooling and stirring and the mixture warmed up in hot water. The organic solution is decanted off and the aqueous mixture extracted twice with 75 ml hot benzene. The combined organic solutions are washed with water, dried, filtered and evaporated in vacuo. The residue is taken up in ethyl acetate, the solution acidified with hydrogen chloride in ethyl acetate, the precipitate formed is collected, recrystallized from acetone and dried in vacuo, to yield the 1-hydroxy-1-[4-(2-pyrrolidinoethoxy)-phenyl]-6-methoxy-1,2,3,4-tetrahydro-naphthalene-2-spirocyclohexane hydrochloride of the formula

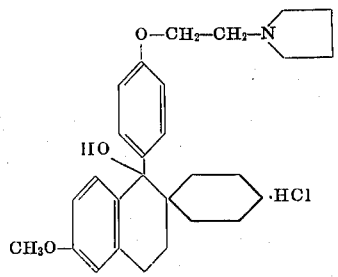

melting at 193° with decomposition.

The starting material is prepared as follows: To the suspension of 57.2 g potassium t.-butoxide in 500 ml benzene, the solution of 36 g 1-oxo-6-methoxy-1,2,3,4-tetrahydro-naphthalene in 150 ml benzene is added during 30 minutes while cooling and stirring under nitrogen. Hereupon, the solution of 46.9 g 1,5-dibromopentane in 100 ml benzene is added during 45 minutes, the mixture is allowed to slowly warm up to room temperature and is refluxed for 5 hours while stirring. After standing overnight, it is poured over 350 g crushed ice and 80 ml concentrated hydrochloric acid, the organic layer separated and the aqueous solution extracted with diethyl ether. The combined organic solutions are washed with 5 percent aqueous sodium carbonate and water, dried, filtered and evaporated in vacuo. The residue is distilled and the fraction boiling at 160°–163°/0.3 mm Hg collected; it represents the 1-oxo-6-methoxy-1,2,3,4-tetrahydro-naphthalene-2-spirocyclohexane melting at 70°–71.5° after recrystallization from methanol.

In the analogous manner, the following starting materials are prepared from equivalent amounts of the corresponding intermediates:

a. 1-oxo-5-methoxy-1,2,3,4-tetrahydro-naphthalene-2-spirocyclohexane b.p. 138°–151°/0.2 mm Hg;

b. 1-oxo-1,2,3,4-tetrahydro-naphthalene-2-spirocyclopentane, b.p. 99°–1–3°/0.2 mm Hg;

c. 1-oxo-6-methoxy-1,2,3,4-tetrahydro-naphthalene-2-spirocyclopentane, b.p. 144°–146°/0.3 mm Hg;

d. 1-oxo-2,3-dihydro-indene-2-spirocyclohexane, b.p. 110°–112°/0.3 mm Hg, m.p. 53°–56°.

Another starting material is prepared as follows: To the stirred solution of 86 g butyrolactone and 1 kg chlorobenzene, kept under nitrogen, 500 g anhydrous aluminum chloride are added portionwise during 2 hours and the mixture is heated to 95° for 20 hours. After cooling it is poured over 2.5 kg ice and 400 ml concentrated hydrochloric acid. The organic layer is separated and the aqueous solution extracted with toluene. The combined organic solutions are washed with water, 200 ml 20 percent aqueous potassium hydroxide and water again, dried, filtered and evaporated in vacuo. The residue is distilled and the fraction boiling at 115°/0.3 mm Hg collected. According to vapor phase chromatography, it consists of 46–48 percent 5-chloro-, 16–22 percent 6-chloro- and 16–24 percent 7-chloro- 1-oxo-1,2,3,4-tetrahydro-naphthalene. On standing at room temperature for several days, crystals separate, which are filtered off and washed with cooled pentane to yield the mixture consisting of 56.4 percent 5-chloro- and 43.6 percent 7-chloro-1-oxo-1,2,3,4-tetrahydronaphthalene (Fraction A). The filtrate is allowed to stand for about 1 week, during which time another precipitate is formed. It is filtered off and washed with cooled pentane to yield the mixture consisting of 60.9 percent 5-chloro-, 2.9 percent 6-chloro- and 33.7 percent 7-chloro-1-oxo-1,2,3,4-tetrahydro-naphthalene (Fraction B). The solution of Fraction A in pentane is subjected to thin layer chromatography on alumina and the eluate obtained from the faster moving bands yields the 5-chloro-1-oxo-1,2,3,4-tetrahydro-naphthalene melting at 65.5°–67°. The eluate from the slower moving material yields the 7-chloro-1-oxo-1,2,3,4-tetrahydro-naphthalene melting at 98°–99.5°.

Fraction B is reacted as shown above, first with potassium t-butoxide and the resulting potassium compound with 1,5-dibromopentane to yield e. the mixture of 5-chloro- and 7-chloro-1-oxo-1,2,3,4-tetrahydronaphthalene-2-spirocyclohexane, b.p. 130°–140 °/0.2 mm Hg.

Equivalent amounts of the starting materials shown under Item (a) to (e) and the respective Grignard compounds yield, according to the method shown in the beginning of this example, the corresponding 1-hydroxy-1-[4-(2-pyrrolidino-, 2-dimethylamino- or 2-diethylamino-ethoxy)-phenyl]-compounds and the 1-hydroxy-1-[4-(3-pyrrolidino-, 3-dimethylamino- or 3-diethylamino-propoxy)-phenyl]-compounds, as well as the 1-hydroxy-1-[4-(2-pyrrolidino-ethoxy)-phenyl]-1,2,3,4-tetrahydro-naphthalene-2-spirocyclohexane hydrochloride.

EXAMPLE 4

The mixture of 2.5 g 1-hydroxy-1-[4-(2-pyrrolidino-ethoxy)-phenyl]-1,2,3,4-tetrahydro-naphthalene-2-spirocyclohexane hydrochloride, 50 ml glacial acetic acid and 1.5 g 10 percent palladium on charcoal is hydrogenated at room temperature and 50 p.s.i. until the theoretical amount of hydrogen has been absorbed. It is diluted with water, filtered, the filtrate evaporated in vacuo and the residue acidified with a few drops hydrochloric acid. It is recrystallized from ethyl acetate and dried in vacuo, to yield the 1-[4-(2-pyrrolidino-ethoxy)-phenyl]-1,2,3,4-tetrahydro-naphthalene-2-spirocyclohexane hydrochloride melting at 128°–130°; it is identical with the compound obtained according to Example 1.

EXAMPLE 5

To the mixture of 0.5 g lithium aluminum-hydride and 25 ml anhydrous diethyl ether, the solution of 1.0 g 1-(N,N-diethyl-carbamoyl-methoxy)-phenyl-1,2,3,4-tetrahydro-naphthalene-2-spirocyclohexane in 5 ml diethyl ether is added dropwise while stirring and the whole is stirred at room temperature overnight. Hereupon 1.5 ml ethyl acetate are added, followed by 0.5 ml water, 1 ml 5 percent aqueous sodium hydroxide and 1.5 ml water. The precipitate formed is filtered off, washed with diethyl ether, the filtrate dried and evaporated, 0.8 g of the residue are dissolved in 5 ml isopropanol, and to the solution 0.24 g maleic acid in 3 ml isopropanol are added. The mixture is concentrated to about half of its volume and allowed to stand in the cold. The precipitate formed is filtered off, recrystallized from isopropanol and dried in vacuo, to yield the 1-[4-(2-diethylamino-ethoxy)-phenyl]-1,2,3,4-tetrahydro-naphthalene-2-spirocyclohexane maleate melting at 118°–119°; it is identical with the product obtained according to Example 2.

The starting material is prepared as follows: To the suspension of 1.1 g magnesium turnings in 10 ml tetrahydrofuran, the solution of 8.4 g 4-bromo-anisol in 10 ml tetrahydrofuran is added dropwise while stirring and keeping the mixture under nitrogen. After the reaction has subsided, the mixture is heated for one-half hour to 65°. It is then cooled in an ice bath and the solution of 6.5 g 1-oxo-1,2,3,4-tetrahydro-naphthalene-2-spirocyclohexane in 10 ml tetrahydrofuran is added dropwise during one-half hour while stirring and keeping the temperature below 15°. The mixture is stirred for 5 hours at room temperature and is allowed to stand overnight. It is again cooled in an ice bath and 25 ml water are added dropwise, followed by the mixture of 10 ml concentrated hydrochloric acid and 50 ml water, as well as by 50 ml diethyl ether. The organic layer is separated, the aqueous solution extracted with diethyl ether and the organic solutions combined. They are washed with water, dried, filtered and evaporated. The residue is recrystallized from ethanol-benzene to yield the 1-hydroxy-1-(4-methoxy-phenyl)-1,2,3,4-tetrahydro-naphthalene-2-spirocyclohexane melting at 118°–120°.

The mixture of 3.22 g thereof, 50 ml glacial acetic acid and 1.5 g 10 percent palladium on charcoal is hydrogenated at room temperature and 50 p.s.i. After 70 minutes the theoretical amount of hydrogen has been absorbed, and the mixture is filtered. The filtrate is evaporated in vacuo, the residue taken up in diethyl ether, the solution washed with 10 percent aqueous potassium carbonate, dried, filtered and evaporated, to yield the 1-(4-methoxy-phenyl-1,2,3,4-tetrahydro-naphthalene-2-spirocyclohexane(I.R. 1247 and 758cm$^{-1}$). 5.0 g thereof are heated in the melt, prepared from 42 g pyridine and 50 ml concentrated hydrochloric acid, to about 250° for 30 minutes. The mixture is poured onto ice, the whole extracted with diethyl ether, the extract washed with water and saturated aqueous sodium acetate, dried, filtered and evaporated. The residue is recrystallized from methanol, to yield the 1-(4-hydroxy-phenyl)-1,2,3,4-tetrahydro-naphthalene-2-spirocyclohexane melting at 155°–157°.

To the solution of 22 g thereof in 150 ml toluene and 50 ml dimethylformamide, 3.56 g of a 56 percent suspension of sodium hydride in mineral oil are added and the mixture heated for 45 minutes to 90° while stirring. After cooling, 13.9 g ethyl bromoacetate are added dropwise, the mixture stirred at room temperature overnight and finally heated to 70° for 1 hour. It is cooled, filtered and the filtrate evaporated in vacuo. The residue is taken up in water, the mixture extracted with diethyl ether, the extract washed with water, dried, filtered and evaporated to yield the 1-(4-carbethoxymethoxy)-phenyl-1,2,3,4-tetrahydro-naphthalene-2-spirocyclohexane.

30 g thereof are dissolved in 200 ml ethanol and the solution of 8.45 g potassium hydroxide in 50 ml water is added. The mixture is refluxed for 1 hour and evaporated in vacuo. The residue is taken up in water, and the solution extracted with diethyl ether. The aqueous layer is separated, acidified with hydrochloric acid and extracted with diethyl ether. The extract is washed with water, dried, filtered and evaporated to yield the 1-(4-carboxymethoxy)-phenyl-1,2,3,4-tetrahydro-naphthalene-2-spirocyclohexane (its sodium salt melts at 300°–305° dec.).

The mixture of 6 g thereof, 25 ml benzene and 2.5 ml thionyl chloride is refluxed for 1 hour and evaporated in vacuo. To the residue benzene is added, which again is distilled off. The residue is dissolved in 25 ml benzene and the solution added dropwise to the mixture of 5.5 g diethylamine in 25 ml benzene while stirring and keeping the temperature below 20°. The mixture is stirred overnight at room temperature and the precipitate formed filtered off. The filtrate is evaporated in vacuo, the residue taken up in diethyl ether, the solution washed with water, 2N aqueous hydrochloric acid, 2N aqueous sodium hydroxide and water. It is dried, filtered and evaporated to yield the 1-(N,N-diethylcarbamoyl-methoxy)-phenyl-1,2,3,4-tetrahydro-naphthalene-2-spirocyclohexane (I.R. bands at 1647, 1180 and 821 cm$^{-1}$). Instead of using diethylamine, 4.0 g 2-diethylamino-ethanol and 50 ml benzene can be used, and the mixture is refluxed 4 hours and allowed to stand 2 days at room temperature. It is combined with water and 10 percent aqueous potassium carbonate, the organic layer washed with water, dried and evaporated in vacuo, to yield the 2-diethylamino ethyl ester of the 1-(4-carboxymethoxy)-phenyl-1,2,3,4-tetrahydronaphthalene-2-spirocyclohexane, whose sulfaminocyclohexane salt melts at 192°–194°.

Instead of using the 1-(4-methoxy-phenyl)-1,2,3,4-tetrahydro-naphthalene-2-spirocyclohexane the analogously prepared 1-(4-cyclopentoxy-phenyl)-1,2,3,4-tetrahydro-naphthalene-2-spirocyclohexane can be used as intermediate (I.R. 1170 and 742 cm$^{-1}$).

EXAMPLE 6

Preparation of 10,000 tablets each containing 50.0 mg of the active ingredient:

Formula:
| | |
|---|---|
| 1-[4-(2-diethylamino-ethoxy)-phenyl]-1,2,3,4-tetrahydro-naphthalene-2-spiro-cyclohexane maleate | 500.00 g |
| Lactose | 1,706.00 g |
| Corn Starch | 90.00 g |
| Polyethylene glycol 6,000 | 90.00 g |
| Talcum powder | 90.00 g |
| Magnesium stearate | 24.00 g |
| Purified water | q.s. |

Procedure

All the powders are passed through a screen with openings of 0.6 mm. Then the drug substance, lactose, talcum, magnesium stearate and half of the starch are mixed in a suitable mixer. The other half of the starch is suspended in 45 ml water and the suspension added to the boiling solution of the polyethylene glycol in 180 ml water. The paste formed is added to the powders which are granulated, if necessary, with an additional amount of water. The granulate is dried overnight at 35°, broken on a screen with 1.2 mm openings and compressed into tablets using concave punches with 7.1 mm diameter, uppers bisected.

EXAMPLE 7

Instead of converting the resulting basic compounds of the invention, mentioned in Example 3, into their hydrochlorides, they may be isolated and characterized also in the basic form. Accordingly, the resulting 1-hydroxy-1-[4-(2-pyrrolidino-ethoxy)-phenyl]-1,2,3,4-tetrahydro-naphthalene-2-spiro-cyclohexane of the formula

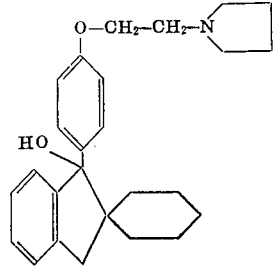

is recrystallized from benzene-hexane and melts at 127°–129°, and the 1-hydroxy-1-[4-(2-pyrrolidino-ethoxy-phenyl]-2,3-dihydroindene-2-spirocyclohexane of the formula

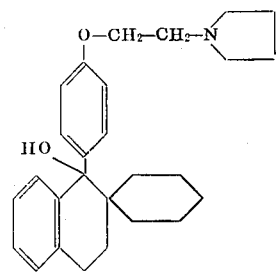

is recrystallized from isopropanol and melts at 111°–112°.

EXAMPLE 8

To the Grignard reagent, prepared from 6.9 g 4-(2-pyrrolidino-ethoxy)-bromobenzene and 0.62 g magnesium turnings in 30 ml tetrahydrofuran under nitrogen, the solution of 4.8 g 1-oxobenzosuberane-2-spirocyclohexane in 20 ml tetrahydrofuran is added dropwise while stirring and cooling. The mixture is stirred for 4 hours and allowed to stand at room temperature overnight. It is filtered, the filtrate evaporated in vacuo and the residue taken up in benzene. To the solution, 50 ml water are added dropwise while cooling and stirring and the mixture warmed up in hot water. The organic solution is decanted off and the aqueous mixture extracted twice with 75 ml hot benzene. The combined organic solutions are washed with water, dried, filtered and evaporated in vacuo down to about 0.1 mm Hg pressure, until about 4 g solid material remains. It is taken up in the minimum amount of acetone, the solution acidified with hydrogen chloride in ethyl acetate, the precipitate formed filtered off and washed with cold acetone, to yield the 1-hydroxy-1-[ 4-(2-pyrrolidino-ethoxy-phenyl]-benzosuberane-2-spirocyclohexane hydrochloride of the formula

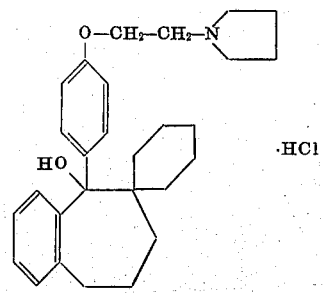

melting at 191°–193°.

EXAMPLE 9

To the Grignard reagent, prepared from 5.4 g 4-(2-pyrrolidino-ethoxy)-bromobenzene and 0.49 g magnesium turnings in 25 ml tetrahydrofuran under nitrogen, the solution of 3.1 g 1-oxo-6-methoxy-1,2,3,4-tetrahydro-naphthalene-2-spirocycloheptane in 20 ml tetrahydrofuran is added dropwise while stirring and cooling. The mixture is stirred for 4 hours and allowed to stand at room temperature overnight. It is filtered, the filtrate evaporated in vacuo and the residue taken up in benzene. To the solution, 30 ml water are added dropwise while cooling and stirring and the mixture warmed up in hot water. The organic solution is decanted off and the aqueous mixture extracted twice with 75 ml hot benzene. The combined organic solutions are washed with water, dried, filtered and evaporated in vacuo down to about 0.1 mm Hg pressure, until about 2 g solid material remains. It is taken up in the minimum amount of acetone, the solution acidified with hydrogen chloride in ethyl acetate, the precipitate formed filtered off and washed with cold acetone, to yield the 1-hydroxy-1-[4-(2-pyrrolidinoethoxy-phenyl]-6-methoxy-1,2,3,4-tetrahydro-naphthalene-2-spirocycloheptane of the formula

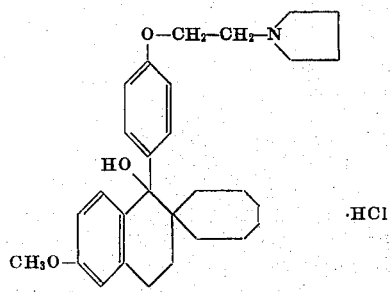

melting at 183°–184° with decomposition.

EXAMPLE 10

To the Grignard reagent, prepared from 16.2 g 4-(2-pyrrolidino-ethoxy)-bromobenzene and 1.46 g magnesium turnings in 60 ml tetrahydrofuran, the solution of 10.6 g 1-oxo-1,2,3,4-tetrahydro-naphthalene-2-spirocyclohex-3-ene in 20 ml tetrahydrofuran is added dropwise while stirring and cooling. The mixture is stirred for 4 hours and allowed to stand at room temperature overnight. It is filtered, the filtrate evaporated in vacuo and the residue taken up in benzene. To the solution, 50 ml water are added dropwise while cooling and stirring and the mixture warmed up in hot water. The organic solution is decanted off and the aqueous mixture extracted twice with 75 ml hot benzene. The combined organic solutions are washed with water, dried, filtered and evaporated in vacuo. The residue is taken up in ethyl acetate, the solution acidified with hydrogen chloride in ethyl acetate, and the precipitate formed collected. It is dissolved in the minimum amount of water, the solution washed with diethyl ether and made basic with 2N aqueous sodium hydroxide. The mixture is extracted with diethyl ether, the extract washed with water, dried and evaporated in vacuo. The residue is taken up in ethyl acetate, the solution acidified with hydrogen chloride in ethyl acetate, cooled in an ice bath, the precipitate formed filtered off, washed with cold acetone and recrystallized from isopropanol, to yield the 1-hydroxy-1-[4-(2-pyrrolidino-ethoxy)-phenyl]-1,2,3,4-tetrahydro-naphthalene-2-spirocyclohex-3-ene hydrochloride of the formula

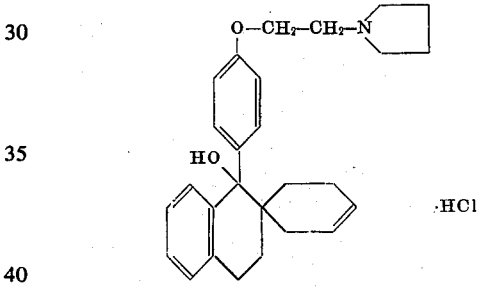

melting at 157°–162°.

EXAMPLE 11

According to the method described in Examples 3 and 8–10, the 1-hydroxy-1-[4-(2-pyrrolidino-ethoxy)-phenyl]-6-cyclopentoxy- or -5,6-dimethoxy-1,2,3,4-tetrahydro-naphthalene-2-spirocyclohexane or their hydrochlorides of the formulae

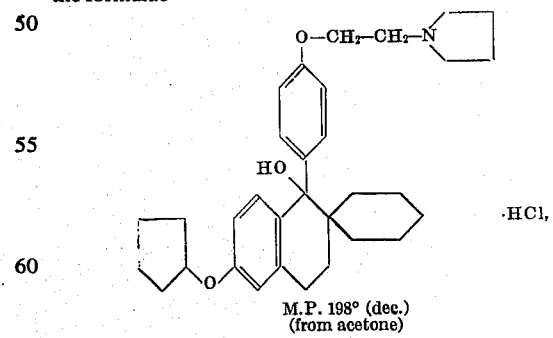

M.P. 198° (dec.)
(from acetone)

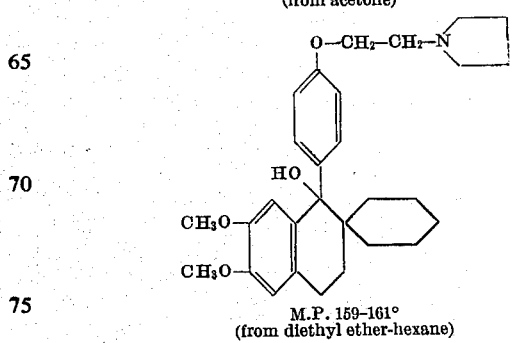

M.P. 159–161°
(from diethyl ether-hexane)

are prepared.

EXAMPLE 12

The mixture of 5 g 1-hydroxy-1-[4-(2-pyrrolidino-ethoxy)-phenyl]-1,2,3,4-tetrahydro-naphthalene-2-spirocyclohexane, 125 ml ethanol and 1.5 ml concentrated sulfuric acid is refluxed for about 2 hours and concentrated to about 25 ml. It is cooled, made basic with 2N aqueous sodium hydroxide and extracted with a total of 250 ml diethyl ether. The extract is washed with water, dried, evaporated in vacuo, and the residue recrystallized from ethanol to yield the 1-ethoxy-1-[4-(2-pyrrolidino-ethoxy)-phenyl]-1,2,3,4-tetrahydro-naphthalene-2-spirocyclohexane of the formula

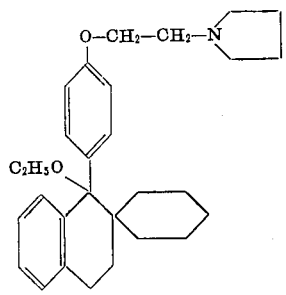

melting at 129°–131°.

EXAMPLE 13

7.08 g 1-hydroxy-1-[4-(2-pyrrolidino-ethoxy-phenyl]-2,3-dihydro-indene-2-spirocyclohexane are hydrogenated in 100 ml glacial acetic acid over 3 g 10 percent palladium on charcoal at 1.3 at and room temperature until the theoretical amount of hydrogen has been absorbed. The mixture is filtered, the filtrate evaporated in vacuo and the residue taken up in water. The solution obtained is made basic with 6N aqueous sodium hydroxide, the mixture extracted with diethyl ether, the extract washed with water, dried and evaporated, to yield the 1-[4-(2-pyrrolidino-ethoxy-phenyl]-2,3-dihydro-indene-2-spirocyclohexane of the formula

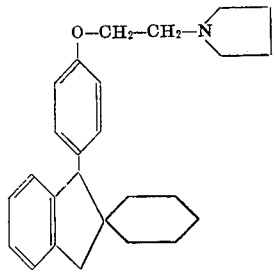

moving 9.5 cm in the thin-layer chromatogram on silica gel in benzene-hexane-diethylamino (45:45:10) as compared with 8.0 cm for the starting material.

In the analogous manner, the 1-[4-(2-pyrrolidino-ethoxy)-phenyl]-6-cyclopentoxy-1,2,3,4-tetrahydro-naphthalene-2-spirocyclohexane is obtained, moving 10.5 cm in the thin-layer chromatogram on silica gel in chloroform-diethylamine (9:1), as well as the 1-[4-(2-pyrrolidino-ethoxy)-phenyl]-6-methoxy-1,2,3,4-tetrahydronaphthalene-2-spirocyclohexane, which is converted into its hydrochloride, which melts at 250°–251° after recrystallization from isopropanol-methanol (5:1).

I claim:

1. A basic ether of 1-hydroxyphenylbenzcycloalkane-2-spiroaliphatic compounds having the formula

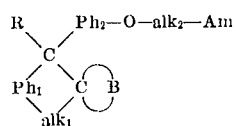

in which $Ph_1$ is 1,2-phenylene, (lower alkyl)-1,2-phenylene, mono-or di-(lower alkoxy)-1,2-phenylene, (three to seven ring-membered lower cycloalkoxy)-1,2-phenylene, (halogeno)-1,2-phenylene or (trifluoromethyl)-1,2-phenylene, $alk_1$ is lower alkylene contributing two ring-carbon atoms, B is lower alkylene contributing five ring-carbon atoms, $Ph_2$ is 1,4-phenylene, R is hydrogen, hydroxy or lower alkoxy, Am is di-lower alkylamino or pyrrolidino, and $alk_2$ is lower alkylene separating the adjacent heteronitrogen atom by two or three carbon atoms, or therapeutically useful acid addition salts thereof.

2. A compound as claimed in claim 1 and having the formula in which $R_1$ is hydrogen, hydroxy, methoxy or ethoxy, $R_2$ is hydrogen or methoxy, $R_3$ is hydrogen, methoxy or cyclopentoxy, $Am_1$ is dimethylamino, diethylamino or pyrrolidino, and p is the integer 2 or 3, or therapeutically useful acid addition salts thereof.

3. A compound as claimed in claim 2 and being the 1-[4-(3-dimethylamino-propoxy)-phenyl]-1,2,3,4-tetrahydro-naphthalene-2-spirocyclohexane or a therapeutically acceptable acid addition salt thereof.

4. A compound as claimed in claim 2 and being the 1-[4-(2-pyrrolidino-ethoxy)-phenyl]-1,2,3,4-tetrahydro-naphthalene-2-spirocyclohexane or a therapeutically acceptable acid addition salt thereof.

5. A compound as claimed in claim 2 and being the 1-[4-(2-diethylamino-ethoxy)-phenyl]-1,2,3,4-tetrahydro-naphthalene-2-spirocyclohexane or a therapeutically acceptable acid addition salt thereof.

6. A compound as claimed in claim 2 and being the 1-[4-(2-pyrrolidino-ethoxy)-phenyl]-6-methoxy-1,2,3,4-tetrahydronaphthalene-2-spirocyclohexane or a therapeutically acceptable acid addition salt thereof.

* * * * *